United States Patent
Pribble et al.

(10) Patent No.: US 10,402,944 B1
(45) Date of Patent: Sep. 3, 2019

(54) DETERMINING A POSITION OF AN OBJECT IN A ROTATION CORRECTED IMAGE

(71) Applicant: Capital One Services, LLC, McLean, VA (US)

(72) Inventors: Jason Pribble, McLean, VA (US); Nicholas Capurso, Tysons Corner, VA (US); Daniel Alan Jarvis, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/999,000

(22) Filed: Aug. 20, 2018

(51) Int. Cl.
- G06K 9/36 (2006.01)
- G06T 3/60 (2006.01)
- G06K 9/00 (2006.01)
- G06T 7/62 (2017.01)
- G06T 5/00 (2006.01)

(52) U.S. Cl.
CPC ............ G06T 3/60 (2013.01); G06K 9/00456 (2013.01); G06T 5/009 (2013.01); G06T 7/62 (2017.01)

(58) Field of Classification Search
CPC combination set(s) only.
See application file for complete search history.

(56) References Cited

U.S. PATENT DOCUMENTS

| | | | |
|---|---|---|---|
| 5,872,870 A * | 2/1999 | Michael | G06T 7/70 382/174 |
| 6,360,026 B1 | 3/2002 | Kulkarni et al. | |
| 6,430,320 B1 | 8/2002 | Jia et al. | |
| 6,956,587 B1 | 10/2005 | Anson | |
| 8,855,375 B2 | 10/2014 | Macciola et al. | |
| 9,672,510 B2 | 6/2017 | Roach et al. | |
| 2011/0110606 A1 * | 5/2011 | Johnson | G06T 3/608 382/296 |
| 2011/0228342 A1 * | 9/2011 | Dolan | G06K 9/3283 358/3.26 |
| 2013/0163896 A1 * | 6/2013 | Chen | G06T 3/0068 382/278 |
| 2013/0182002 A1 * | 7/2013 | Macciola | H04N 1/387 345/589 |

(Continued)

FOREIGN PATENT DOCUMENTS

CN 106228168 A 12/2016

Primary Examiner — Vu Le
Assistant Examiner — Guillermo M Rivera-Martinez
(74) Attorney, Agent, or Firm — Harrity & Harrity, LLP

(57) ABSTRACT

A user device may capture an image including an object, and may identify the object, including determining an outline of the object. The user device may determine a first center point of the object and an angle of orientation of the object in relation to the image. The user device may rotate the image based on the angle of orientation, including changing one or more dimensions of the image. The user device may, after rotating the image, determine the one or more dimensions of the rotated image, calculate one or more offset values associated with changing the one or more dimensions of the rotated image, and determine a second center point of the object based on the first center point and the one or more offset values. The user device may perform an action related to the rotated image based on determining the second center point of the object.

20 Claims, 10 Drawing Sheets

FIG. 1D

(56) References Cited

U.S. PATENT DOCUMENTS

| | | | |
|---|---|---|---|
| 2014/0362248 A1* | 12/2014 | Ishida | H04N 5/23293 348/222.1 |
| 2015/0271514 A1* | 9/2015 | Yoshikawa | H04N 19/50 375/240.12 |
| 2016/0125613 A1* | 5/2016 | Shustorovich | G06K 9/00463 382/140 |

* cited by examiner

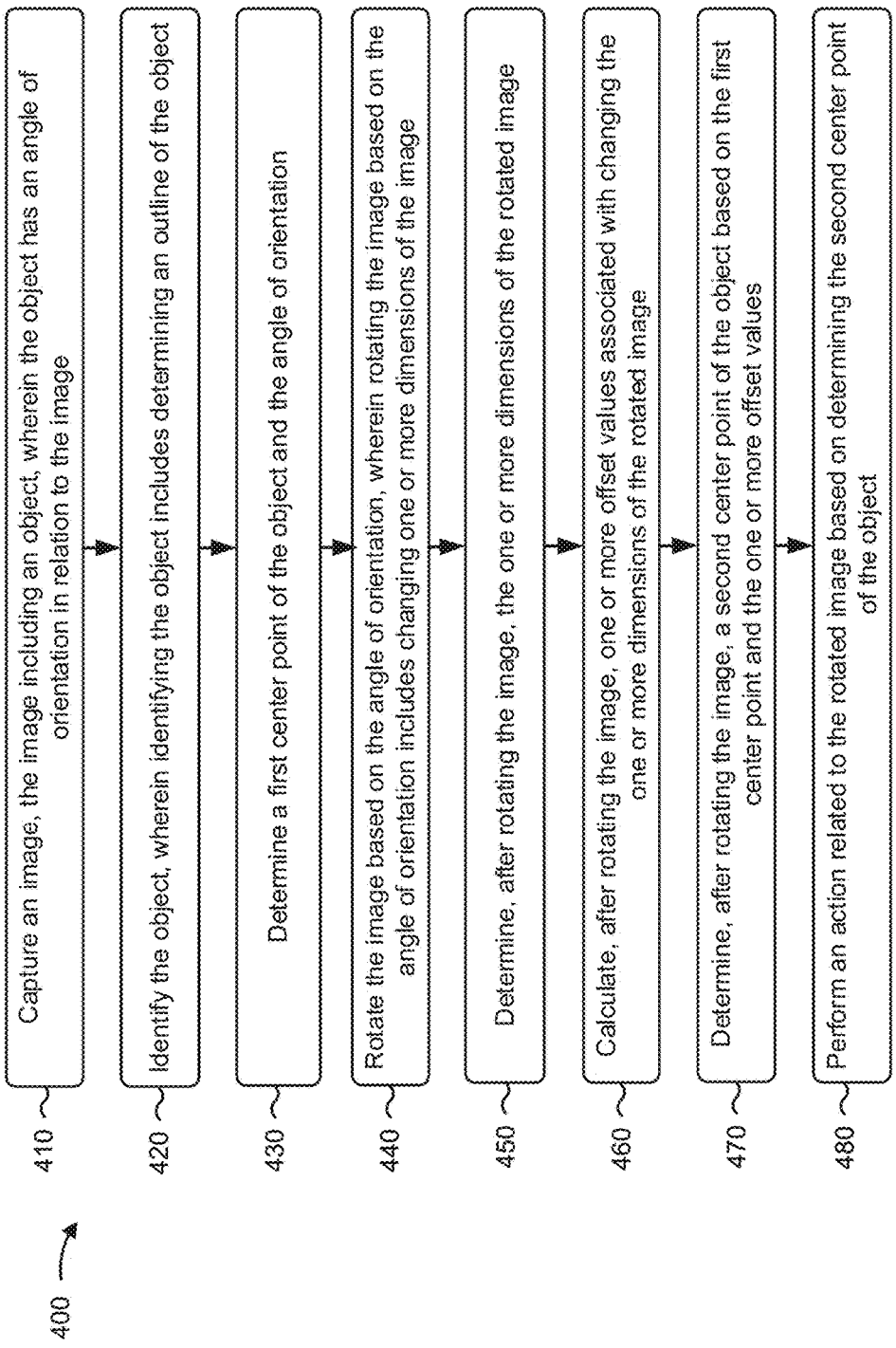

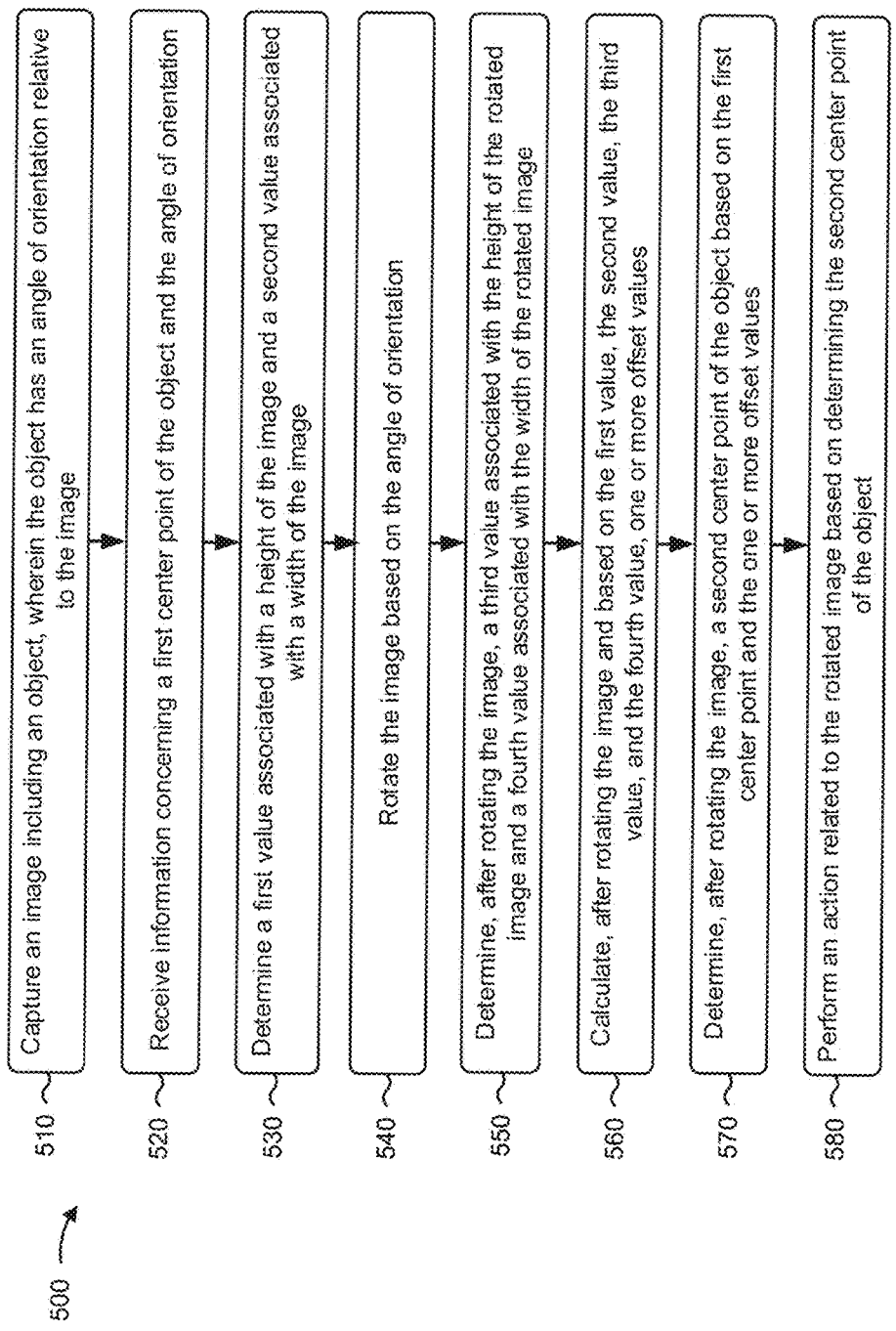

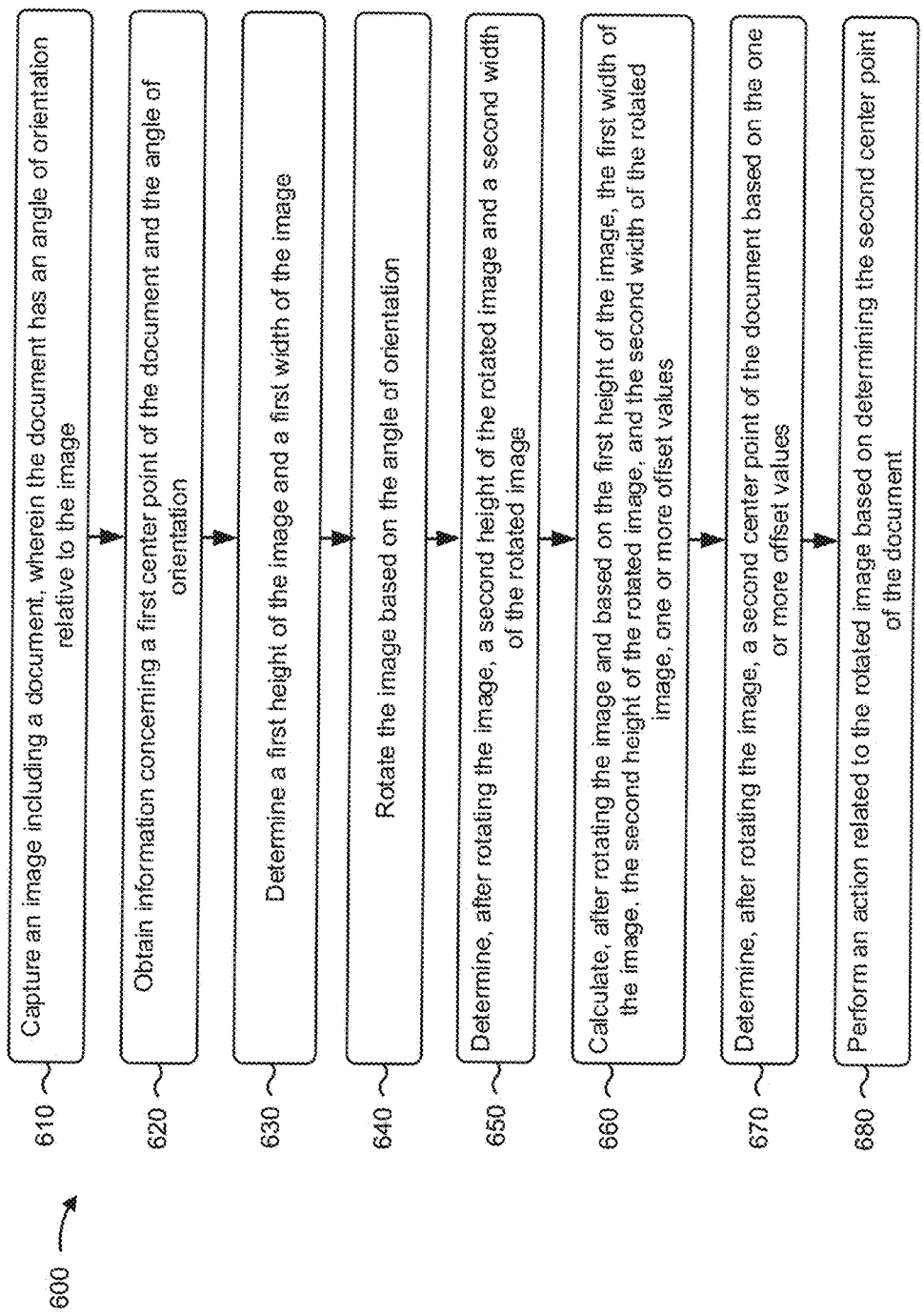

DETERMINING A POSITION OF AN OBJECT IN A ROTATION CORRECTED IMAGE

BACKGROUND

A digital image that includes visual information may be rotated such that one or more dimensions of the digital image (e.g., a width of the digital image, a height of the digital image, and/or the like) may change to ensure that the visual information is maintained (e.g., the visual information is not lost due to cropping the digital image, resizing the digital image, and/or the like).

SUMMARY

According to some possible implementations, a method may include capturing, by a user device, an image, the image including an object, wherein the object has an angle of orientation in relation to the image. The method may include identifying, by the user device, the object, wherein identifying the object includes determining an outline of the object. The method may include determining, by the user device, a first center point of the object and the angle of orientation. The method may include rotating, by the user device, the image based on the angle of orientation, wherein rotating the image based on the angle of orientation includes changing one or more dimensions of the image. The method may include determining, by the user device and after rotating the image, the one or more dimensions of the rotated image, and calculating, by the user device and after rotating the image, one or more offset values associated with changing the one or more dimensions of the rotated image. The method may include determining, by the user device and after rotating the image, a second center point of the object based on the first center point and the one or more offset values, and performing, by the user device, an action related to the rotated image based on determining the second center point of the object.

According to some possible implementations, a user device may include one or more memories, and one or more processors, communicatively coupled to the one or more memories, to capture an image including an object, wherein the object has an angle of orientation relative to the image. The one or more processors may receive information concerning a first center point of the object and the angle of orientation, and may determine a first value associated with a height of the image and a second value associated with a width of the image. The one or more processors may rotate the image based on the angle of orientation, and may determine, after rotating the image, a third value associated with the height of the rotated image and a fourth value associated with the width of the rotated image. The one or more processors may calculate, after rotating the image and based on the first value, the second value, the third value, and the fourth value, one or more offset values. The one or more processors may determine, after rotating the image, a second center point of the object based on the first center point and the one or more offset values, and may perform an action related to the rotated image based on determining the second center point of the object.

According to some possible implementations, a non-transitory computer-readable medium may store instructions that include one or more instructions that, when executed by one or more processors of a device, cause the one or more processors to capture an image including a document, wherein the document has an angle of orientation relative to the image. The one or more instructions may cause the one or more processors to obtain information concerning a first center point of the document and the angle of orientation, and to determine a first height of the image and a first width of the image. The one or more instructions may cause the one or more processors to rotate the image based on the angle of orientation, and to determine, after rotating the image, a second height of the rotated image and a second width of the rotated image. The one or more instructions may cause the one or more processors to calculate, after rotating the image and based on the first height of the image, the first width of the image, the second height of the rotated image, and the second width of the rotated image, one or more offset values. The one or more instructions may cause the one or more processors to determine, after rotating the image, a second center point of the document based on the one or more offset values, and to perform an action related to the rotated image based on determining the second center point of the document.

BRIEF DESCRIPTION OF THE DRAWINGS

FIG. 4 is a flow chart of an example process for determining a position of an object in a rotation corrected image.

FIG. 5 is a flow chart of an example process for determining a position of an object in a rotation corrected image.

FIG. 6 is a flow chart of an example process for determining a position of an object in a rotation corrected image.

DETAILED DESCRIPTION

Figure 1A:
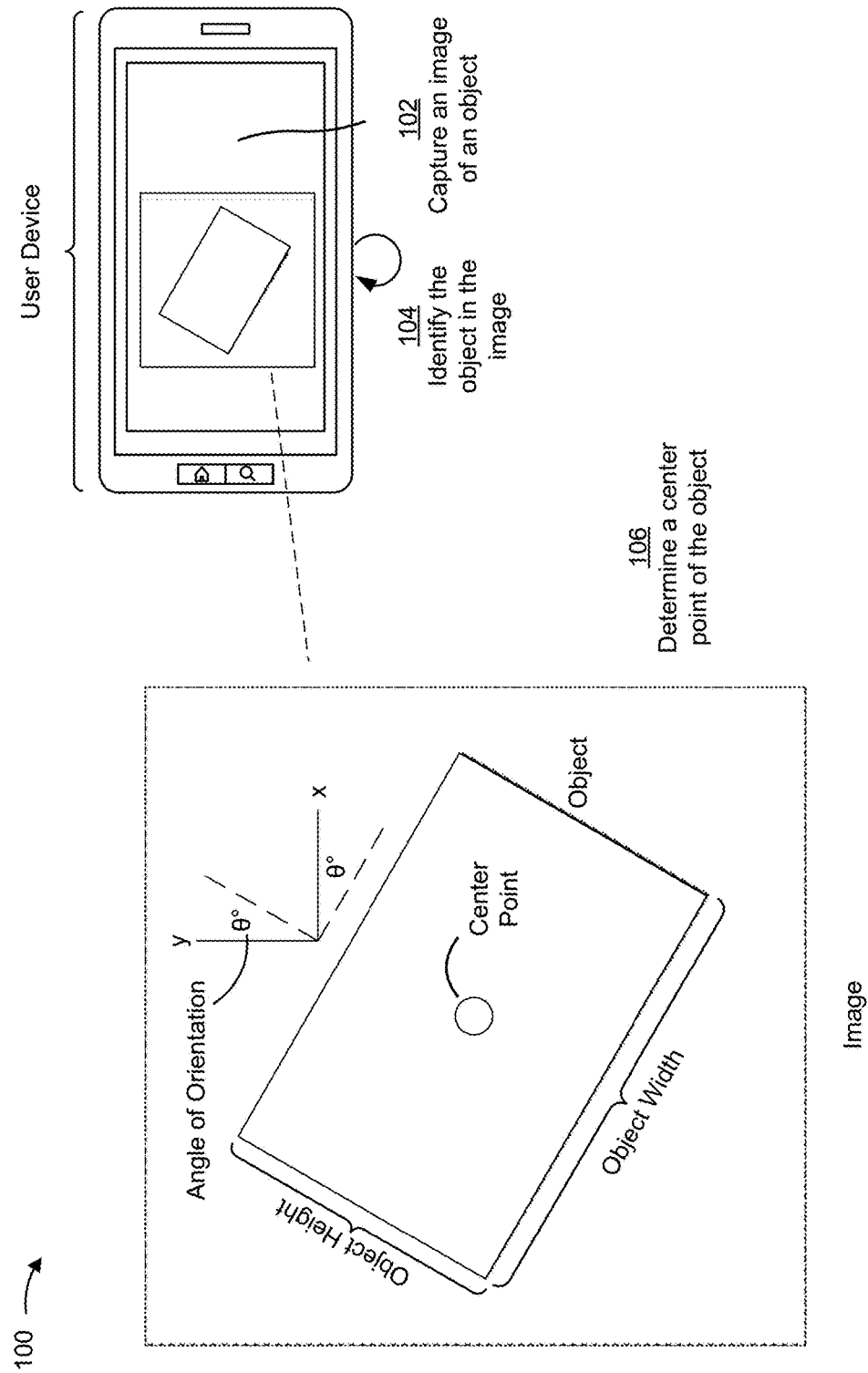
FIGS. 1A-1E are diagrams of example implementations described herein.

The following detailed description of example implementations refers to the accompanying drawings. The same reference numbers in different drawings may identify the same or similar elements.

Some entities (e.g., financial institutions, such as banks and/or the like) permit account applicants, or customers, to capture images of verification documentation (e.g., government-issued identification (ID) cards and/or the like) and/or financial documentation (e.g., a check, a money order, and/or the like) using a user device (e.g., a smartphone), and submit the images over the Internet for validation. However, this can often be a frustrating process for a user, particularly if an entity's backend platform repeatedly rejects uploaded images for not meeting certain image quality standards. For example, the server may reject the image of a verification documentation if the verification documentation is not oriented in the image correctly. Furthermore, the amount of time required for a user device to capture an image, upload the image to the server, and process the image increases as the file size of the image increases. Moreover, as the image's file size increases, more data may be transmitted to the server than may be needed for the server to process the image.

Some implementations, described herein, provide a user device that is able to automatically capture an image including image data associated with an object, identify the object and an angle of orientation of the object relative to one or more reference axes (e.g., the x-axis, the y-axis, and/or the like of the image), rotate the image based on the angle of orientation so that one or more dimensions of the object align with the one or more reference axes (e.g., the x-axis of the image prior to rotation, the y-axis of the image prior to rotation, and/or the like), calculate a center point of the object, and perform an action related to the rotated image, such as cropping the rotated image around the object. In some implementations, the user device may detect the object in a field of view of a camera of the user device and capture the image. In some implementations, the user device may identify the object in the image and one or more characteristics concerning the object, such as a center point of the object, a height of the object, a width of the object, the angle of orientation, and/or the like. In some implementations, the user device may rotate the image based on the angle of orientation and change the one or more dimensions of the rotated image. In some implementations, the user device may calculate the one or more dimensions of the rotated image after rotating the image and may calculate one or more offset values associated with changing the one or more dimensions of the rotated image. In some implementations, the user device may calculate a center point of the object after rotation of the image and perform an action, such as cropping the rotated image around the object, based on calculating the center point of the object. In some implementations, the user device may send the cropped rotated image to a server device for processing, such as for verifying the cropped rotated image.

In this way, the user device optimizes determining a position of an object in a rotation corrected image, which enables the user device to perform pre-processing operations related to the image. In this way, the user device ensures that one or more dimensions of the object are aligned with one or more dimensions of the rotated image (e.g., the x-axis of the object aligns with the x-axis of the rotated image, the y-axis of the object aligns with the y-axis of the rotated image, and/or the like), which can facilitate an image pre-processing application, such as cropping the rotated image around the object. This also conserves computing resources, power resources, and memory resources of the user device that would otherwise need to be expended to perform image pre-processing where the one or more dimensions of the object are not aligned with the one or more dimensions of the original image (e.g. less computing resources, power resources, and memory resources are needed to perform a pre-processing operation where the one or more dimensions of the object are aligned with the one or more dimensions of the rotated image because less processing is needed to identify the boundaries of the object). In this way, the user device minimizes the file size of the pre-processed image, which shortens the amount of time to upload, and process the pre-processed image. In addition, this conserves computing resources, memory resources, and network resources, associated with a backend platform, such as a server, that would otherwise need to be expended to receive and process pre-processed images with a large file size.

FIGS. 1A-1E are diagrams of example implementations 100 described herein. Example implementation 100 may include a user device (e.g., a mobile device, such as a smartphone and/or the like) and an object, such as a document (e.g., a document that indicates identification information, a government-issued identification (ID) card, an employee ID card, a health insurance card, a transaction card (e.g., a credit card, a debit card, an automated teller machine (ATM) card, and/or the like), a check, a money order, and/or the like). In some implementations, the user device may include a camera (e.g., one or more cameras) configured to capture images, and one or more applications (e.g., provided by, or associated with, an entity, such as a financial institution (e.g., a bank and/or the like)) capable of facilitating image capturing. In some implementations, the user may activate the one or more applications on the user device to capture an image of the object.

As shown in FIG. 1A, and by reference number 102, the user device captures an image including image data associated with an object. In some implementations, the one or more applications may instruct the user to position the user device over the object for the user device to capture the image including the object. In some implementations, the user may point the camera of the user device at the object and the camera of the user device may capture the image. In some implementations, the user device may detect the object in a field of view of the camera of the user device and automatically capture the image including the object based on detecting the object in the field of view of the camera. In some implementations, capturing the image includes saving the image in memory as an image file with a file size. In some implementations, the user device may cause a display of the user device to display the image as the user device captures the image (e.g., in real-time (or near real-time)).

In some implementations, the object has an angle of orientation relative to the image. In some implementations, the angle of orientation is relative to one or more reference axes, such as one or more dimensions of the image (e.g., an x-axis of the image, a y-axis of the image, and/or the like). For example, as shown in FIG. 1A, the one or more reference axes are the x-axis and the y-axis of the image and the object may have an angle of orientation that is oriented 0 degrees from the one or more reference axes.

As shown by reference number 104, the user device (e.g., via an application executing on the user device) identifies the object in the image. In some implementations, the user device may process the image to identify the object in the image. For example, the user device may employ one or more computer vision techniques (e.g., a scale-invariant feature transform (SIFT) technique, a speeded up robust features (SURF) technique, a generalized robust invariant feature (G-RIF) technique, and/or the like) to process the image to detect and identify the object. In some implementations, processing the image may include determining one or more elements concerning the object, such as an outline of the object, a boundary outline of the object, a bounding box of the object, a bounding rectangle of the object, a bounding polygon of the object, a shape around the object, and/or the like. In some implementations, the user device may cause display of the one or more elements concerning the object as an overlay (e.g., an augmented reality overlay) on the image. For example, the user device may cause display of a rectangular shape around a government-issued ID card.

As shown by reference number 106, the user device (e.g., via an application executing on the user device) determines one or more characteristics concerning the object, such as a center point of the object, a height of the object, a width of the object, the angle of orientation, and/or the like. For example, where the object has a rectangular shape, such as a transaction card, the user device may determine a height of the object and a width of the object to determine the center point of the object. In some implementations, the user device may receive information regarding the one or more characteristics concerning the object. For example, the user device may receive information regarding the first center point of the object, the height of the object, the width of the object, and the angle of orientation from a server device (e.g., where the image was sent to the server device for processing), a separate application of the one or more applications (e.g., a particular object identification application) on the user device, and/or the like.

In some implementations, the user device may determine the one or more dimensions of the image. For example, the user device may determine a height of the image, a width of the image, a center point of the image, and/or the like. In some implementations, the user device may determine a first value associated with a height of the image, a second value associated with a width of the image, a third value associated with a center point of the image, and/or the like.

Figure 1B:
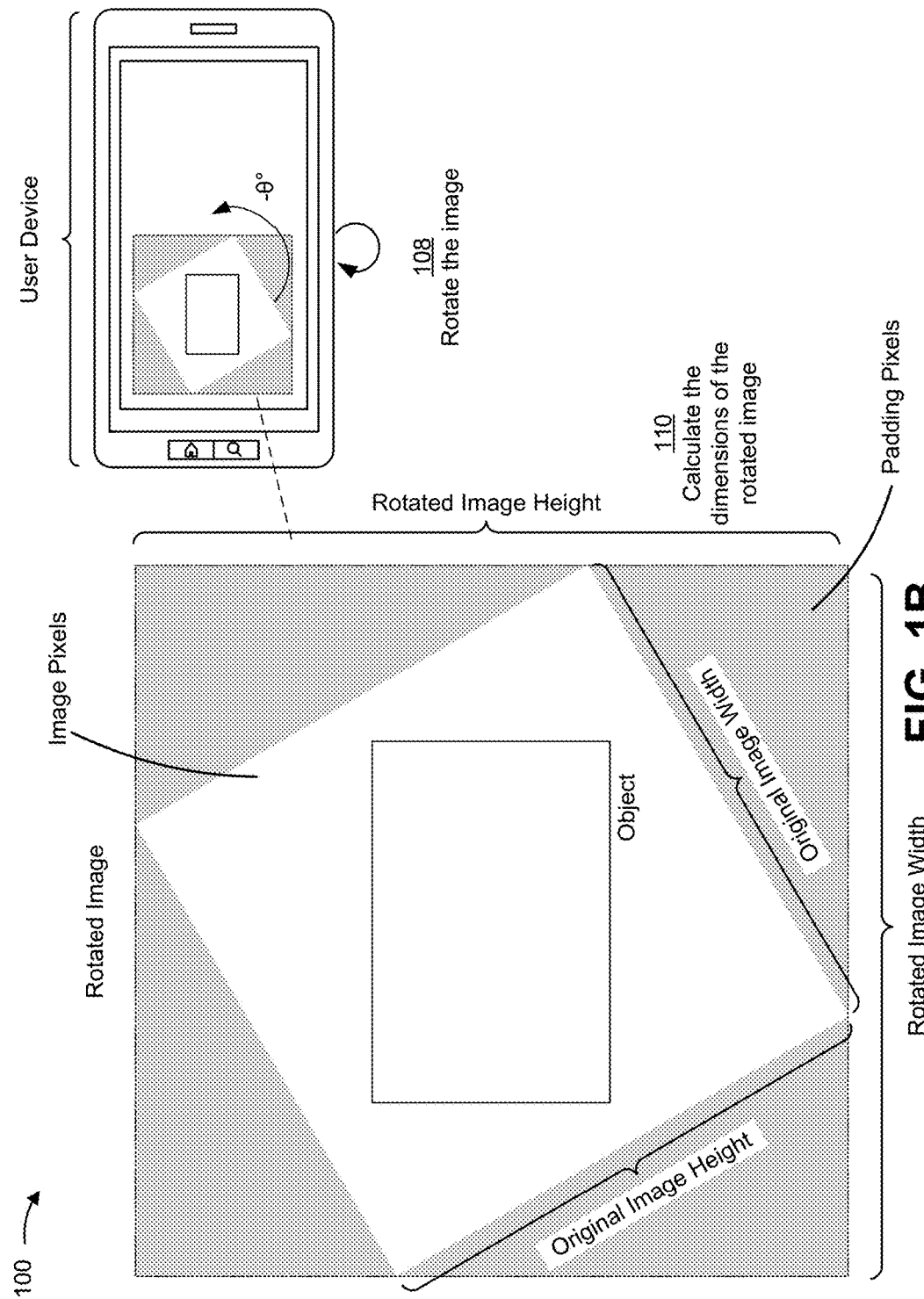

As shown in FIG. 1B, and reference number 108, the user device (e.g., via an application executing on the user device) rotates the image based on the angle of orientation. In some implementations, the user device may rotate the image around the center point of the image based on the angle of orientation. In some implementations, the user device may rotate the image by an angle of rotation that is equal to the angle of orientation, but in the opposite direction. For example, where the angle of orientation is θ degrees, the user device may rotate the image by an angle of rotation that is −θ degrees. In this way, the user device may rotate the image such that one or more dimensions of the object (e.g., an x-axis of the object, a y-axis of the object, and/or the like) align with the one or more reference axes (e.g., the x-axis of the image prior to rotation, the y-axis of the image prior to rotation, and/or the like). This may assist the user device in performing an action related to the object, as described below, such as cropping the object from the rotated image (e.g., the image after rotation).

In some implementations, rotating the image based on the angle of orientation may include changing the one or more dimensions of the rotated image so that the rotated image includes image pixels (e.g., pixels associated with the image before the user device rotates the image) and padding pixels (e.g., pixels that are added to the rotated image after the user device rotates the image). The user device may add the padding pixels to the rotated image to change the one or more dimensions of the rotated image to ensure that the image pixels remain part of the rotated image (e.g., the user device creates a bounding rectangle around the rotated image that includes the image pixels and fills in the empty spaces with the padding pixels). For example, as shown in FIG. 1B, the user device rotated the image based on the angle of orientation and increased the height of the rotated image and the width of the rotated image by adding padding pixels to the rotated image to ensure that all the image pixels remain part of the rotated image, to ensure that no part of the object is cropped, and/or the like. In some implementations, rotating the image and changing the one or more dimensions of the rotated image changes the file size of the image file saved in memory.

As shown by reference number 110, the user device (e.g., via an application executing on the user device) calculates the one or more dimensions of the rotated image after rotating the image. For example, the user device may determine a height of the rotated image, a width of the rotated image, a center point of the rotated image, and/or the like after rotating the image. In some implementations, the user device may determine, after rotating the image, a first value associated with the height of the rotated image, a second value associated with the width of the rotated image, a third value associated with the center point of the rotated image, and/or the like.

Figure 1C:
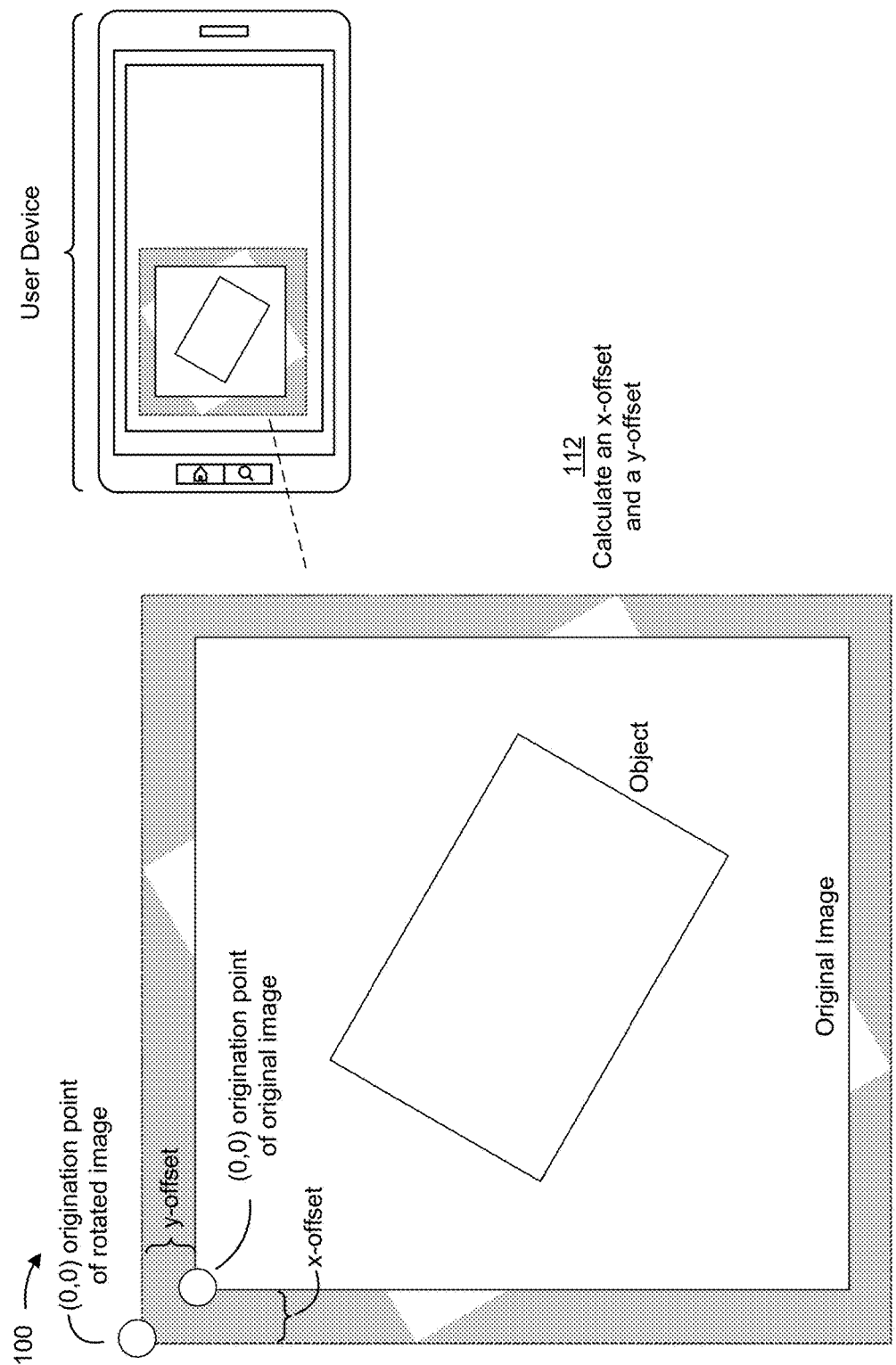

As shown in FIG. 1C and by reference number 112, the user device (e.g., via an application executing on the user device) may calculate one or more offset values associated with changing the one or more dimensions of the rotated image. In some implementations, the one or more offset values may include a height offset value based on the height of the original image (e.g., the image prior to rotation) and/or the height of the rotated image (e.g., the image after rotation), a width offset value based on the width of the original image and/or the width of the rotted image, and/or the like. In some implementations, the one or more offset values are related to an origination point of the original image, an origination point of the rotated image, and/or the like. For example, as shown in FIG. 1C, a width offset value (e.g., an x-offset) and a height offset value (e.g., a y-offset) are related to an origination point of the original image (e.g., a (0,0) origination point of the original image) and to an origination point of the rotated image (e.g., a (0,0) origination point of the rotated image).

In some implementations, the user device may calculate the one or more offset values by comparing the one or more dimensions of the original image (e.g., the image prior to rotation) and the one or more dimensions of the rotated image (e.g., the image after rotation). For example, the user device may calculate the height offset value based on a difference between the height of the image prior to rotation and the height of the image after rotation (e.g., a difference between the height of the original image and the height of the rotated image), the width offset value based on a difference between the width of the image prior to rotation and the width of the image after rotation (e.g., a difference between the width of the original image and the width of the rotated image), and/or the like. In some implementations, the user device may use the following example formulas to calculate the height offset value and the width offset value:

$$\text{height offset value} = (\text{height}_{AR} - \text{height}_{PR})/2$$

$$\text{width offset value} = (\text{width}_{AR} - \text{width}_{PR})/2$$

where:

AR indicates the image after rotation (e.g., the rotated image); and

PR indicates the image prior to rotation (e.g., the original image).

Figure 1D:
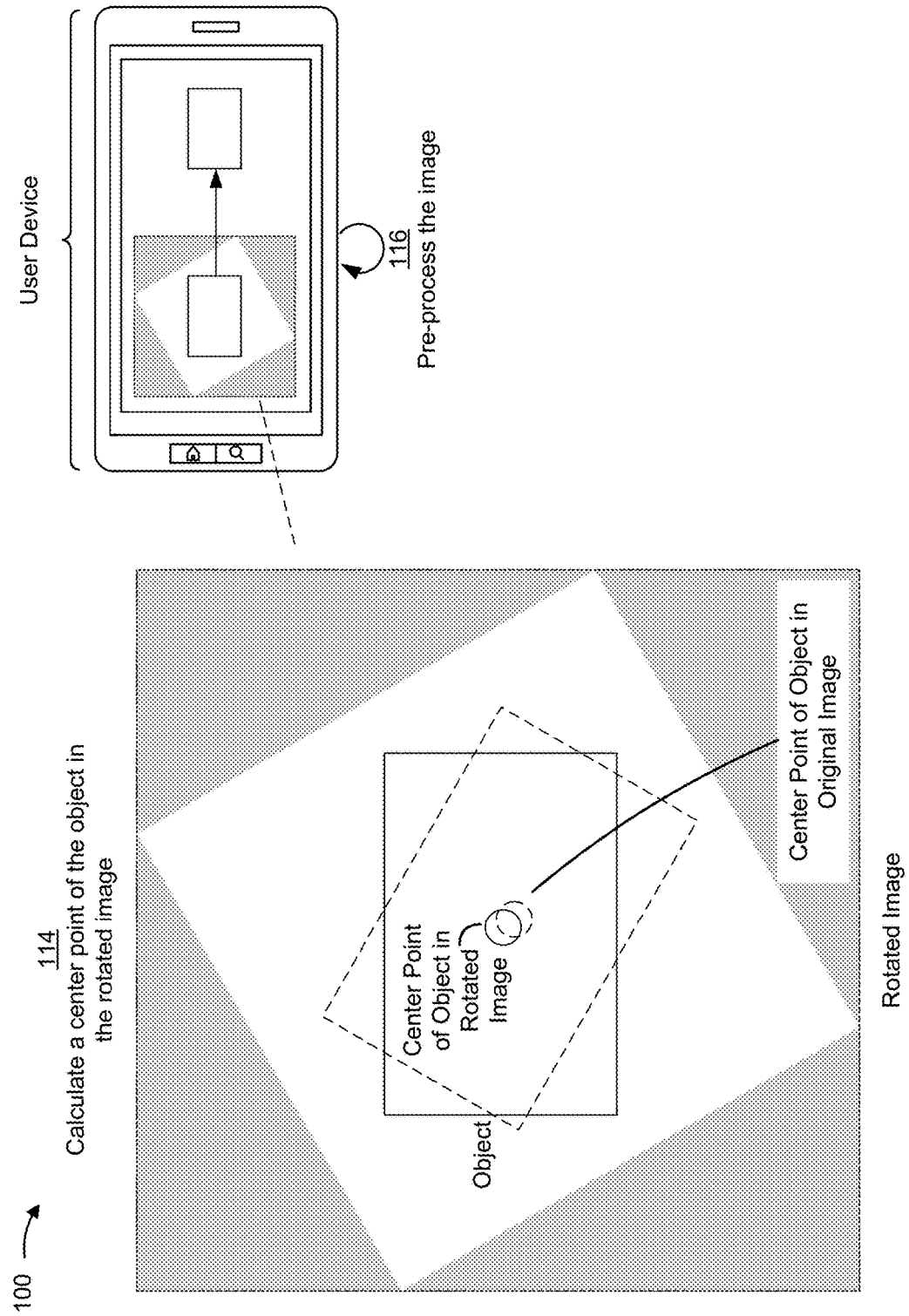

As shown in FIG. 1D and by reference number 114, the user device (e.g., via an application executing on the user device) calculates a center point of the object in the rotated image. In some implementations, the user device may calculate the center point of the object in the rotated image based on the center point of the object in the original image, the one or more offset values, the one or more dimensions of the original image, the one or more dimensions of the rotated image, and/or the like. For example, the user device may use the following example formulas to determine a horizontal value (e.g., an x-value) and a vertical value (e.g., a y-value) of the center point of the object in the rotated image:

$$x = (a.x - b.x) * \cos(-\theta) - (a.y - b.y) * \sin(-\theta) + b.x + x\text{Offset}$$

$$y = (a.y - b.y) * \cos(-\theta) + (a.x - b.x) * \sin(-\theta) + b.y + y\text{Offset}$$

where:

a is the center point of the object in the original image (e.g., the image prior to image rotation);

b is the center point of the image in the rotated image (e.g., the image after image rotation);

xOffset is the width offset value;

yOffset is the height offset value; and

θ is the angle of orientation of the object relative to the one or more reference axes.

As shown by reference number 116, the user device (e.g., via an application executing on the user device) performs an action related to the image based on determining the center point of the object in the rotated image. In some implementations, the action comprises a pre-processing operation, such as cropping the object out of the rotated image. In some implementations, the user device may crop the object from the rotated image based on the center point of the object in the rotated image and/or the one or more characteristics of the object. In some implementations, the user device may crop the rotated image around the object based on the center point of the object in the rotated image and/or the one or more characteristics of the object. For example, where the object is a government-issued ID card, the user device can calculate the coordinates of a border of the object based on the center point of the object in the rotated image, the height of the object, and the width of the object (e.g., calculate the coordinates of the four corners that comprise the rectangle-shaped government-issued ID card in the rotated image), which enables the user device to crop the object from the rotated image, crop the rotated image around the object, crop the object out of the rotated image, and/or the like. In some implementations, performing the action related to the image changes the file size of the image file saved in memory.

In some implementations, the user device may create an outline of the object based on the center point of the object in the rotated image and/or the one or more characteristics of the object. For example, the user device may create a rectangular outline of a health insurance card based on the center point of the health insurance card in the rotated image, the height of the health insurance card, and the width of the health insurance card. In some implementations, the user device may crop the object from the rotated image, crop the rotated image around the object, crop the object out of the rotated image, and/or the like based on the outline of the object.

Figure 1E:
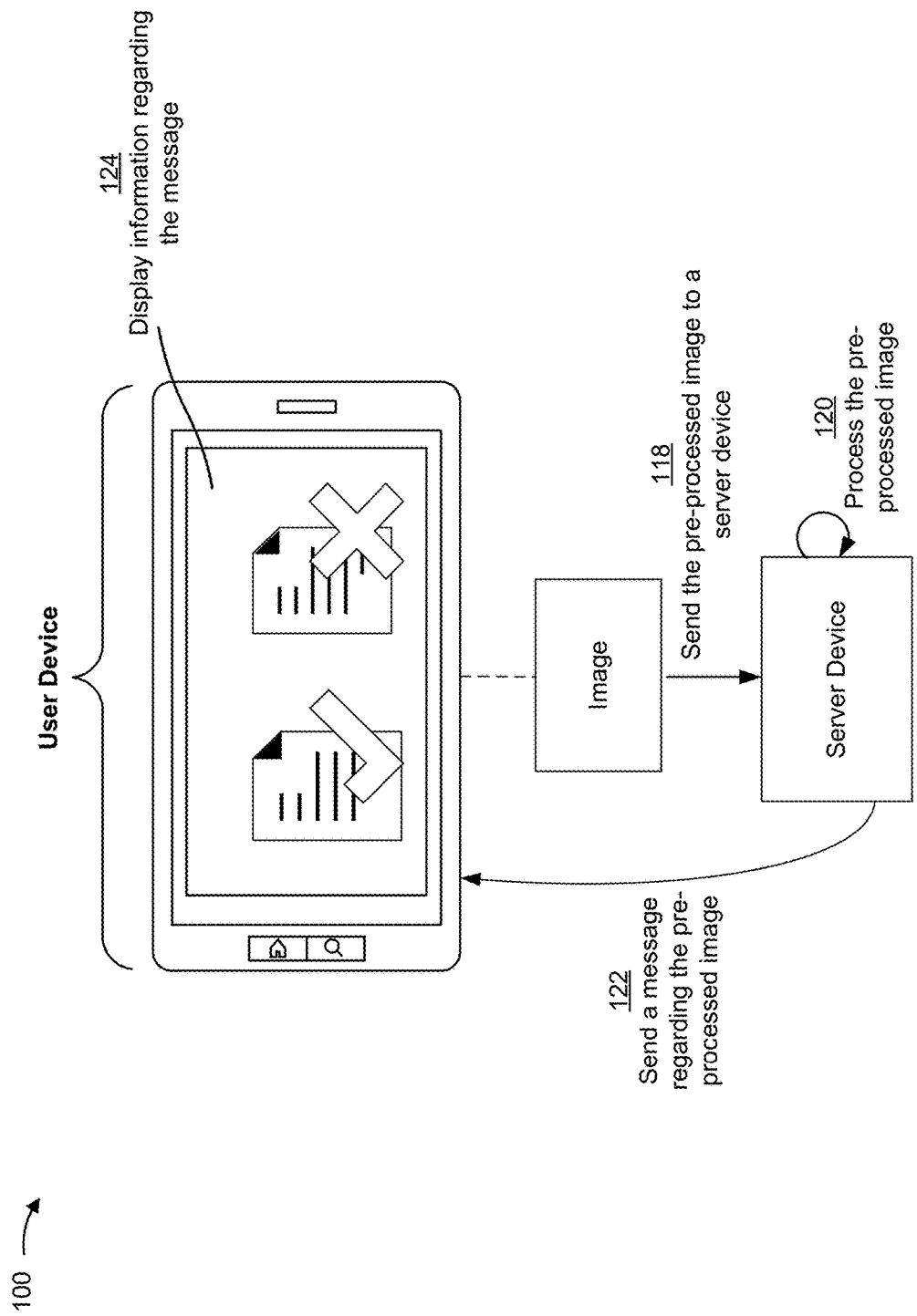

As shown in FIG. 1E, the user device may perform additional and/or alternative actions after rotation of the image. As shown by reference number 118, the user device (e.g., via an application executing on the user device) may send a pre-processed image (e.g., the rotated image, the cropped rotated image, the rotated image with the object cropped out, image data concerning the object cropped from the rotated image, and/or the like) to a server device (e.g., the user device may upload the pre-processed image to an image verification server). For example, the user device may send the pre-processed image to the server device to verify content of the object in the pre-processed image. As shown by reference number 120, the server device may process the pre-processed image (e.g., the image verification server may verify the pre-processed image). For example, the server device may use a computer vision technique to extract data from the pre-processed image (e.g., extract data concerning the content of the object) and verify that the data is accurate by comparing the data and object-related information from a data structure. As shown by reference number 122, the server device may send a message to the user device regarding the pre-processed image (e.g., the image verification server may send a message to the user device regarding verification of the pre-processed image). For example, the server device may send a message to the user device indicating that the data extracted from the pre-processed image is accurate. As shown by reference number 124, the user device (e.g., via an application executing on the user device) may receive the message and cause display of information regarding the message on the display of the user device (e.g., the user device may present, for display, information indicating whether the pre-processed image has been verified).

By implementing the above techniques, the user device optimizes determining a position of an object in a rotation corrected image, which enables the user device to perform pre-processing operations related to the image. In this way, the user device ensures that one or more dimensions of the object are aligned with one or more dimensions of the rotated image (e.g., the x-axis of the object aligns with the x-axis of the rotated image, the y-axis of the object aligns with the y-axis of the rotated image, and/or the like), which can facilitate an image pre-processing application, such as cropping the rotated image around the object. This also conserves computing resources, power resources, and memory resources of the user device that would otherwise need to be expended to perform image pre-processing where the one or more dimensions of the object are not aligned with the one or more dimensions of the original image (e.g. less computing resources, power resources, and memory resources are needed to perform a pre-processing operation where the one or more dimensions of the object are aligned with the one or more dimensions of the rotated image because less processing is needed to identify the boundaries of the object). In this way, the user device minimizes the file size of the pre-processed image, which shortens the amount of time to upload, and process the pre-processed image. In addition, this conserves computing resources, memory resources, and network resources, associated with a backend platform, such as a server, that would otherwise need to be expended to receive and process pre-processed images with a large file size.

As indicated above, FIGS. 1A-1E are provided merely as examples. Other examples are possible and may differ from what was described with regard to FIGS. 1A-1E.

Figure 2:
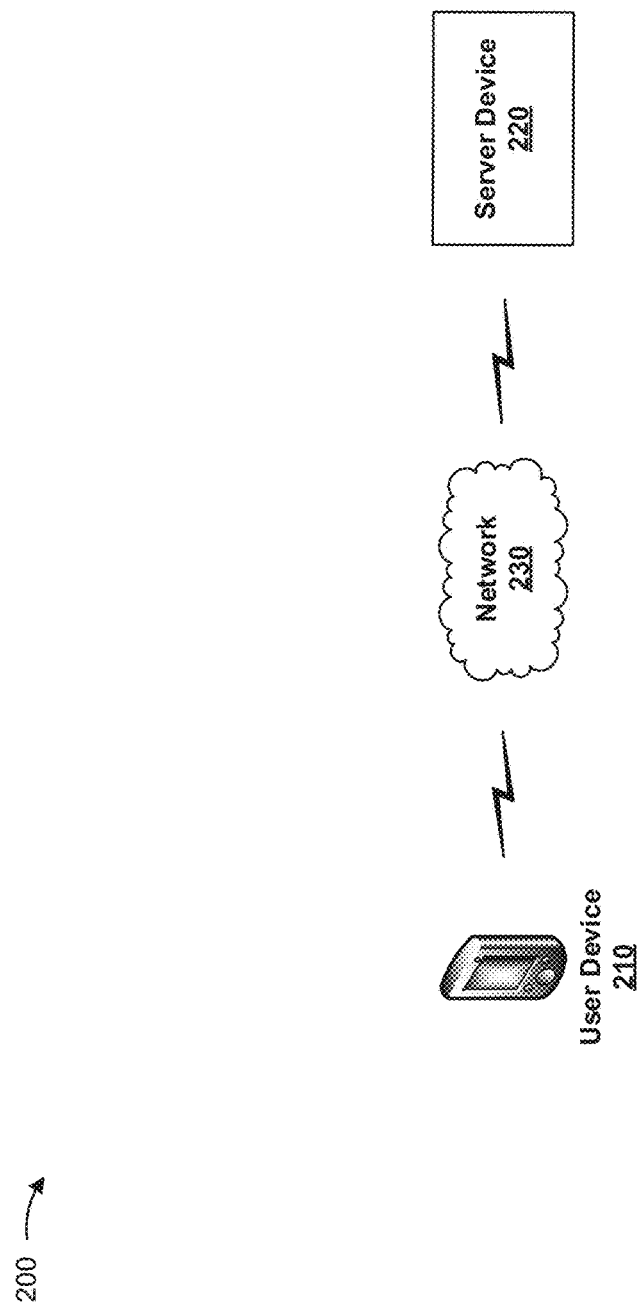
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with identifying an object in a captured image. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include a camera, and may capture an image (e.g., of a document) using the camera. In some implementations, user device 210 may send the captured image, via network 230, to server device 220 for processing the captured image. In some implementations, user device 210 may receive a message from server device 220 and may display the message.

In some implementations, user device 210 may capture an image that includes an object. In some implementations, user device 210 may identify the object in a captured image. In some implementations, user device 210 may determine one or more characteristics concerning the object, such as a center point of the object, a height of the object, a width of the object, the angle of orientation, and/or the like. In some implementations, user device 210 may rotate an image based on an angle of orientation. In some implementations, user device 210 may calculate one or more dimensions of the image after rotating the image. In some implementations, user device 210 may calculate one or more offset values associated with changing one or more dimensions of the image. In some implementations, user device 210 may calculate a center point of the object in the image after rotation of the image. In some implementations, user device 210 may perform an action related to the image based on determining a center point of the object in the image after rotation of the image. For example, user device 210 may crop the object out of the rotated image. In some implementations, user device 210 may send the rotated image to server device 220 (e.g., upload the rotated image to an image verification server). In some implementations, user device 210 may receive a message from a server device regarding an image (e.g., verification of the image). In some implementations, user device 210 may cause display of information regarding the message on the display of user device 210. For example, user device 210 may present, for display, information indicating whether the image has been verified.

Server device 220 includes one or more devices capable of receiving, generating, storing, processing, and/or providing information associated with identifying an object in a captured image. For example, server device 220 may include a server device (e.g., a host server, a web server, an application server, etc.), a data center device, or a similar device, capable of communicating with user device 210 via network 230. In some implementations, server device 220 may receive, from user device 210, an image captured by user device 210, and may process the image. In some implementations, server device 220 may send, to user device 210 via network 230, a message based on processing an image. In some implementations, server device 220 may be an image verification server. In some implementations, server device 220 may receive an image from user device 210 (e.g., user device 210 may upload the image to server device 220). In some implementations, server device 220 may process the image (e.g., the image verification server may verify the image). In some implementations, server device 220 may send a message to user device 210 regarding the image (e.g., the image verification server may send a message to user device 210 regarding verification of the image).

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
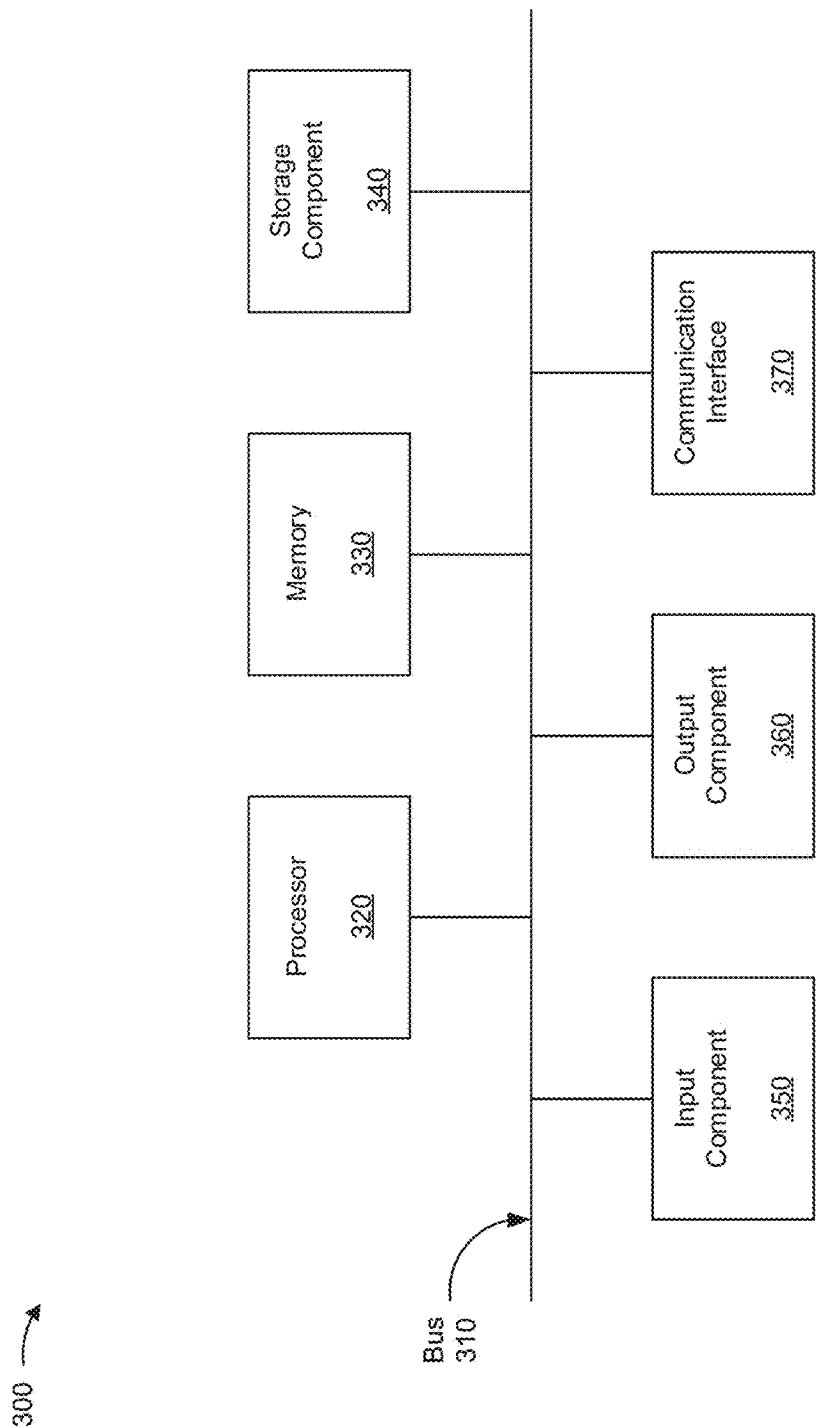
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Additionally, or alternatively, input component 350 may include a camera for capturing an image of an object. Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining a position of an object in a rotation corrected image. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220).

As shown in FIG. 4, process 400 may include capturing an image, the image including an object, wherein the object has an angle of orientation in relation to the image (block 410). For example, the user device (e.g., using processor 320, memory 330, storage component 340, input component 350, communication interface 370, and/or the like) may capture an image, the image including an object, as described above in connection with FIGS. 1A-1E. In some implementations, the object may have an angle of orientation in relation to the image.

As further shown in FIG. 4, process 400 may include identifying the object, wherein identifying the object includes determining an outline of the object (block 420). For example, the user device (e.g., using processor 320, memory 330, storage component 340, and/or the like) may identify the object, as described above in connection with FIGS. 1A-1E. In some implementations, identifying the object may include determining an outline of the object.

As further shown in FIG. 4, process 400 may include determining a first center point of the object and the angle of orientation (block 430). For example, the user device (e.g., using processor 320, memory 330, storage component 340, input and/or the like) may determine a first center point of the object and the angle of orientation, as described above in connection with FIGS. 1A-1E.

As further shown in FIG. 4, process 400 may include rotating the image based on the angle of orientation, wherein rotating the image based on the angle of orientation includes changing one or more dimensions of the image (block 440). For example, the user device (e.g., using processor 320, memory 330, storage component 340, and/or the like) may rotate the image based on the angle of orientation, as described above in connection with FIGS. 1A-1E. In some implementations, rotating the image based on the angle of orientation may include changing one or more dimensions of the image.

As further shown in FIG. 4, process 400 may include determining, after rotating the image, the one or more dimensions of the rotated image (block 450). For example, the user device (e.g., using processor 320, memory 330, storage component 340, and/or the like) may determine, after rotating the image, the one or more dimensions of the rotated image, as described above in connection with FIGS. 1A-1E.

As further shown in FIG. 4, process 400 may include calculating, after rotating the image, one or more offset values associated with changing the one or more dimensions of the rotated image (block 460). For example, the user device (e.g., using processor 320, memory 330, storage component 340, and/or the like) may calculate, after rotating the image, one or more offset values associated with changing the one or more dimensions of the rotated image, as described above in connection with FIGS. 1A-1E.

As further shown in FIG. 4, process 400 may include determining, after rotating the image, a second center point of the object based on the first center point and the one or more offset values (block 470). For example, the user device (e.g., using processor 320, memory 330, storage component 340, and/or the like) may determine, after rotating the image, a second center point of the object based on the first center point and the one or more offset values, as described above in connection with FIGS. 1A-1E.

As further shown in FIG. 4, process 400 may include performing an action related to the rotated image based on determining the second center point of the object (block 480). For example, the user device (e.g., using processor 320, memory 330, storage component 340, input component 350, output component 360, communication interface 370, and/or the like) may perform an action related to the rotated image based on determining the second center point of the object, as described above in connection with FIGS. 1A-1E.

Process 400 may include additional implementations, such as any single implementation or any combination of implementations described below and/or in connection with one or more other processes described elsewhere herein.

In some implementations, when capturing the image including the object, the user device may detect the object in a field of view of a camera of the user device, and may automatically capture the image based on detecting the object in the field of view of the camera. In some implementations, the angle of orientation may be relative to the one or more dimensions of the image.

In some implementations, the object may have a rectangular shape, and determining the first center point of the object and the angle of orientation may include determining a height of the object, determining a width of the object, and determining the first center point of the object based on the height of the object and the width of the object.

In some implementations, the image may include image pixels, and rotating the image based on the angle of orientation may include rotating the image around a center point of the image by an angle of rotation, where the angle of rotation is based on the angle of orientation, and changing the one or more dimensions of the image so that the rotated image includes image pixels and padding pixels.

In some implementations, when determining, after rotating the image, the one or more dimensions of the rotated image, the user device may determine a first value associated with a height of the rotated image, and may determine a second value associated with a width of the rotated image. In some implementations, when calculating, after rotating the image, the one or more offset values associated with changing the one or more dimensions of the image, the user device may calculate a height offset value based on the first value, and may calculate a width offset value based on the second value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for determining a position of an object in a rotation corrected image. In some implementations, one or more process blocks of FIG. 5 may be performed by a user device (e.g., user device 210). In some implementations, one or more process blocks of FIG. 5 may be performed by another device or a group of devices separate from or including the user device, such as a server device (e.g., server device 220).

As shown in FIG. 5, process 500 may include capturing an image including an object, wherein the object has an angle of orientation relative to the image (block 510). For example, the user device (e.g., using processor 320, memory 330, storage component 340, input component 350, communication interface 370, and/or the like) may capture an image including an object, as described above in connection with FIGS. 1A-1E. In some implementations, the object may have an angle of orientation relative to the image.

As further shown in FIG. 5, process 500 may include receiving information concerning a first center point of the object and the angle of orientation (block 520). For example, the user device (e.g., using processor 320, memory 330, storage component 340, input component 350, communication interface 370, and/or the like) may receive information concerning a first center point of the object and the angle of orientation, as described above in connection with FIGS. 1A-1E.

As further shown in FIG. 5, process 500 may include determining a first value associated with a height of the image and a second value associated with a width of the image (block 530). For example, the user device (e.g., using processor 320, memory 330, storage component 340, and/or the like) may determine a first value associated with a height of the image and a second value associated with a width of the image, as described above in connection with FIGS. 1A-1E.

As further shown in FIG. 5, process 500 may include rotating the image based on the angle of orientation (block 540). For example, the user device (e.g., using processor 320, memory 330, storage component 340, and/or the like) may rotate the image based on the angle of orientation, as described above in connection with FIGS. 1A-1E.

As further shown in FIG. 5, process 500 may include determining, after rotating the image, a third value associated with the height of the rotated image and a fourth value associated with the width of the rotated image (block 550). For example, the user device (e.g., using processor 320, memory 330, storage component 340, input component 350, communication interface 370, and/or the like) may determine, after rotating the image, a third value associated with the height of the rotated image and a fourth value associated with the width of the rotated image, as described above in connection with FIGS. 1A-1E.

As further shown in FIG. 5, process 500 may include calculating, after rotating the image and based on the first value, the second value, the third value, and the fourth value, one or more offset values (block 560). For example, the user device (e.g., using processor 320, memory 330, storage component 340, and/or the like) may calculate, after rotating the image and based on the first value, the second value, the third value, and the fourth value, one or more offset values, as described above in connection with FIGS. 1A-1E.

As further shown in FIG. 5, process 500 may include determining, after rotating the image, a second center point of the object based on the first center point and the one or more offset values (block 570). For example, the user device (e.g., using processor 320, memory 330, storage component 340, and/or the like) may determine, after rotating the image, a second center point of the object based on the first center point and the one or more offset values, as described above in connection with FIGS. 1A-1E.

As further shown in FIG. 5, process 500 may include performing an action related to the rotated image based on determining the second center point of the object (block 580). For example, the user device (e.g., using processor 320, memory 330, storage component 340, input component 350, output component 360, communication interface 370, and/or the like) may perform an action related to the rotated image based on determining the second center point of the object, as described above in connection with FIGS. 1A-1E.

Process 500 may include additional implementations, such as any single implementation or any combination of implementations described below and/or in connection with one or more other processes described elsewhere herein.

In some implementations, when calculating, the one or more offset values, the user device may calculate a width offset value based on the first value and the third value, and may calculate a height offset value based on the second value and the fourth value. In some implementations, the one or more offset values may be related to an origination point of the image.

In some implementations, when determining, the second center point of the object, the user device may determine a horizontal value of the second center point based on the first center point of the object, the first value, the second value, the third value, the fourth value, the one or more offset values, and the angle of orientation, and may determine a vertical value of the second center point based on the first center point of the object, the first value, the second value, the third value, the fourth value, the one or more offset values, and the angle of orientation.

In some implementations, when performing the action related to the rotated image based on determining the second center point of the object, the user device may crop the object from the rotated image based on the second center point, a width of the object, and a height of the object. In some implementations, when performing the action related to the rotated image based on determining the second center point of the object, the user device may crop the rotated image around the object based on the second center point, a width of the object, and a height of the object, and may send the cropped rotated image to a remote device after cropping the image. In some implementations, the user device may receive a message regarding the image from the remote device, and may cause display of the message on a display of the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining a position of an object in a rotation corrected image. In some implementations, one or more process blocks of FIG. 6 may be performed by a user device (e.g., user device 210). In some implementations, one or more process blocks of FIG. 6 may be performed by another device or a group of devices separate from or including the user device, such as a server device (e.g., server device 220).

As shown in FIG. 6, process 600 may include capturing an image including a document, wherein the document has an angle of orientation relative to the image (block 610). For example, the user device (e.g., using processor 320, memory 330, storage component 340, input component 350, communication interface 370, and/or the like) may capture an image including a document, as described above in connection with FIGS. 1A-1E. In some implementations, the document may have an angle of orientation relative to the image.

As further shown in FIG. 6, process 600 may include obtaining information concerning a first center point of the document and the angle of orientation (block 620). For example, the user device (e.g., using processor 320, memory 330, storage component 340, input component 350, communication interface 370, and/or the like) may obtain information concerning a first center point of the document and the angle of orientation, as described above in connection with FIGS. 1A-1E.

As further shown in FIG. 6, process 600 may include determining a first height of the image and a first width of the image (block 630). For example, the user device (e.g., using processor 320, memory 330, storage component 340, and/or the like) may determine a first height of the image and a first width of the image, as described above in connection with FIGS. 1A-1E.

As further shown in FIG. 6, process 600 may include rotating the image based on the angle of orientation (block 640). For example, the user device (e.g., using processor 320, memory 330, storage component 340, and/or the like) may rotate the image based on the angle of orientation, as described above in connection with FIGS. 1A-1E.

As further shown in FIG. 6, process 600 may include determining, after rotating the image, a second height of the rotated image and a second width of the rotated image (block 650). For example, the user device (e.g., using processor 320, memory 330, storage component 340, and/or the like) may determine, after rotating the image, a second height of the image and a second width of the image, as described above in connection with FIGS. 1A-1E.

As further shown in FIG. 6, process 600 may include calculating, after rotating the image and based on the first height of the image, the first width of the image, the second height of the rotated image, and the second width of the rotated image, one or more offset values (block 660). For example, the user device (e.g., using processor 320, memory 330, storage component 340, and/or the like) may calculate, after rotating the image and based on the first height of the image, the first width of the image, the second height of the rotated image, and the second width of the rotated image, one or more offset values, as described above in connection with FIGS. 1A-1E.

As further shown in FIG. 6, process 600 may include determining, after rotating the image, a second center point of the document based on the one or more offset values (block 670). For example, the user device (e.g., using processor 320, memory 330, storage component 340, and/or the like) may determine, after rotating the image, a second center point of the document based on the one or more offset values, as described above in connection with FIGS. 1A-1E.

As further shown in FIG. 6, process 600 may include performing an action related to the rotated image based on determining the second center point of the document (block 680). For example, the user device (e.g., using processor 320, memory 330, storage component 340, input component 350, output component 360, communication interface 370, and/or the like) may perform an action related to the rotated image based on determining the second center point of the document, as described above in connection with FIGS. 1A-1E.

Process 600 may include additional implementations, such as any single implementation or any combination of implementations described below and/or in connection with one or more other processes described elsewhere herein.

In some implementations, the document may include a government-issued identification card, an employee identification card, a health insurance card, or a transaction card. In some implementations, when calculating the one or more offset values, the user device may calculate a height offset value based on a difference between the first height of the image and the second height of the rotated image, and may calculate a width offset value based on a difference between the first width of the image and the second width of the rotated image.

In some implementations, when performing the action related to the rotated image based on determining the second center point of the document, the user device may crop the document from the rotated image based on the second center point of the document, a height of the document, and a width of the document. In some implementations, the user device may determine, after rotating the image, a center point of the rotated image based on the second height of the rotated image and the second width of the rotated image. In some implementations, when determining, the second center point of the document, the user device may determine the second center point of the document based on the first center point of the document, the center point of the rotated image, the angle of orientation, and the one or more offset values.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide a user device that is able to automatically capture an image of an object, identify the object and an angle of orientation of the object relative to the image, rotate the image based on the angle of orientation so that one or more dimensions of the object align with one or more dimensions of the image, identify a center point of the object, and perform an action related to the image, such as cropping the image around the object. In some implementations, the user device may detect the object in a field of view of a camera of the user device and capture the image of the object. In some implementations, the user device may identify the object and one or characteristics concerning the object, such as a center point of the object, a height of the object, a width of the object, the angle of orientation, and/or the like. In some implementations, the user device may rotate the image based on the angle of orientation and change the one or more dimensions of the image. In some implementations, the user device may calculate the one or more dimensions of the image after rotating the image and may calculate one or more offset values associated with changing the one or more dimensions of the image. In some implementations, the user device may calculate a center point of the object after rotation of the image and perform an action, such as cropping the image around the object, based on calculating the center point of the object. In some implementations, the user device may send the image to a server device for processing, such as for verifying the image.

In this way, the user device optimizes determining a position of an object in a rotation corrected image, which enables the user device to perform an action related to the image. In this way, the user device ensures that one or more dimensions of the object are aligned with one or more dimensions of the image, which can facilitate an image processing application, such as cropping the image around the object. In this way, the user device minimizes the file size of the image, which shortens the amount of time to capture, upload, and process the image. This also conserves computing resources, power resources, and memory resources of the user device that would otherwise need to be expended to perform image processing where the one or more dimensions of the object are not aligned with the one or more dimensions of the image. In addition, this conserves computing resources, memory resources, and network resources, associated with a backend platform, such as a server, that would otherwise need to be expended to receive and process images with a large file size.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    capturing, by a user device, an image, the image including an object,
        wherein the object has an angle of orientation in relation to the image;
    identifying, by the user device, the object,
        wherein identifying the object includes determining an outline of the object;
    determining, by the user device, a first center point of the object and the angle of orientation;
    rotating, by the user device, the image based on the angle of orientation,
        wherein rotating the image based on the angle of orientation includes increasing two dimensions of the image;
    determining, by the user device and after rotating the image, two dimensions of the rotated image;
    calculating, by the user device and after rotating the image, a first offset value and a second offset value,
        the first offset value being associated with a first dimension of the two dimensions of the rotated image, and
        the second offset value being associated with a second dimension of the two dimensions of the rotated image;
    determining, by the user device and after rotating the image, a second center point of the object based on the first center point, the first offset value, and the second offset value; and
    performing, by the user device, an action related to the rotated image based on determining the second center point of the object.

2. The method of claim 1, wherein capturing the image including the object comprises:
    detecting the object in a field of view of a camera of the user device; and
    automatically capturing the image based on detecting the object in the field of view of the camera.

3. The method of claim 1, wherein the angle of orientation is relative to the two dimensions of the image.

4. The method of claim 1, wherein the object has a rectangular shape,
    wherein determining the first center point of the object and the angle of orientation comprises:
        determining a height of the object;
        determining a width of the object; and
        determining the first center point of the object based on the height of the object and the width of the object.

5. The method of claim 1, wherein the image includes image pixels,
    wherein rotating the image based on the angle of orientation comprises:
        rotating the image around a center point of the image by an angle of rotation, wherein the angle of rotation is based on the angle of orientation; and
        adjusting the two dimensions of the image so that the rotated image includes image pixels and padding pixels.

6. The method of claim 1, wherein determining, after rotating the image, the two dimensions of the rotated image comprises:
    determining a first value associated with a height of the rotated image; and
    determining a second value associated with a width of the rotated image.

7. The method of claim 6, wherein calculating, after rotating the image, the first offset value and the second offset value comprises:
    calculating the first offset value based on the first value; and calculating the second offset value based on the second value.

8. A user device, comprising:
one or more memories; and
one or more processors, communicatively coupled to the one or more memories, to:
capture an image including an object,
wherein the object has an angle of orientation relative to the image;
receive information concerning a first center point of the object and the angle of orientation;
determine a first value associated with a height of the image and a second value associated with a width of the image;
rotate the image based on the angle of orientation;
determine, after rotating the image, a third value associated with the height of the rotated image and a fourth value associated with the width of the rotated image, the third value being greater than the first value, and the fourth value being greater than the second value;
calculate, after rotating the image and based on the first value, the second value, the third value, and the fourth value, a first offset value and a second offset value, the first offset value being a difference between the first value and the third value, and
the second offset value being a difference between the second value and the fourth value;
determine, after rotating the image, a second center point of the object based on the first center point, the first offset value, and the second offset value; and
perform an action related to the rotated image based on determining the second center point of the object.

9. The user device of claim 8, wherein the first offset value and the second offset value are related to an origination point of the image.

10. The user device of claim 8, wherein the one or more processors, when determining the second center point of the object, are to:
determine a horizontal value of the second center point based on the first center point of the object, the first value, the second value, the third value, the fourth value, the first offset value, the second offset value, and the angle of orientation; and
determine a vertical value of the second center point based on the first center point of the object, the first value, the second value, the third value, the fourth value, the first offset value, the second offset value, and the angle of orientation.

11. The user device of claim 8, wherein the one or more processors, when performing the action related to the rotated image based on determining the second center point of the object, are to:
crop the object from the rotated image based on the second center point, a width of the object, and a height of the object.

12. The user device of claim 8, wherein the one or more processors, when performing the action related to the rotated image based on determining the second center point of the object, are to:
crop the rotated image around the object based on the second center point, a width of the object, and a height of the object; and
send the cropped rotated image to a remote device after cropping the image.

13. The user device of claim 12, wherein the one or more processors are further to:

receive a message regarding the image from the remote device; and
cause display of the message on a display of the user device.

14. A non-transitory computer-readable medium storing instructions, the instructions comprising:
one or more instructions that, when executed by one or more processors of a user device, cause the one or more processors to:
capture an image including a document,
wherein the document has an angle of orientation relative to the image;
obtain information concerning a first center point of the document and the angle of orientation;
determine a first height of the image and a first width of the image;
rotate the image based on the angle of orientation;
determine, after rotating the image, a second height of the rotated image and a second width of the rotated image,
the second height being greater than the first height, and
the second width being greater than the first width;
calculate, after rotating the image and based on the first height of the image, the first width of the image, the second height of the rotated image, and the second width of the rotated image, a first offset value and a second offset value,
the first offset value being a difference between the first height of the image and the second height of the rotated image, and
the second offset value being a difference between the first width of the image and the second width of the rotated image;
determine, after rotating the image, a second center point of the document based on the first offset value and the second offset value; and
perform an action related to the rotated image based on determining the second center point of the document.

15. The non-transitory computer-readable medium of claim 14, wherein the document includes:
a government-issued identification card,
an employee identification card,
a health insurance card, or
a transaction card.

16. The non-transitory computer-readable medium of claim 14, wherein the one or more instructions, that cause the one or more processors to perform the action related to the rotated image based on determining the second center point of the document, cause the one or more processors to:
crop the document from the rotated image based on the second center point of the document, a height of the document, and a width of the document.

17. The non-transitory computer-readable medium of claim 14, wherein the one or more instructions, when executed by the one or more processors, further cause the one or more processors to:
determine, after rotating the image, a center point of the rotated image based on the second height of the rotated image and the second width of the rotated image.

18. The non-transitory computer-readable medium of claim 17, wherein the one or more instructions, that cause the one or more processors to determine the second center point of the document, cause the one or more processors to:
determine the second center point of the document based on the first center point of the document, the center point of the rotated image, the angle of orientation, the first offset value, and the second offset value.

19. The non-transitory computer-readable medium of claim 14, wherein the one or more instructions, when executed by the one or more processors, further cause the one or more processors to:
add padding pixels to the rotated image based on the second height of the rotated image and the second width of the rotated image.

20. The user device of claim 8, wherein the one or more processors, when capturing the image including the object, are to:
detect the object in a field of view of a camera of the user device; and
automatically capture the image based on detecting the object in the field of view of the camera.

\* \* \* \* \*